US012539796B2

(12) United States Patent
Ekchian et al.

(10) Patent No.: US 12,539,796 B2
(45) Date of Patent: Feb. 3, 2026

(54) ACTIVE SEAT SUSPENSION WITH HIGH FREQUENCY INPUT CANCELLATION

(71) Applicant: ClearMotion Acquisition I LLC, Billerica, MA (US)

(72) Inventors: Jack A. Ekchian, Belmont, MA (US); Pankaj Chopra, Watertown, MA (US); Ari Gordin, Medford, MA (US)

(73) Assignee: ClearMotion Acquisition I LLC, Billerica, MA (US)

( * ) Notice: Subject to any disclaimer, the term of this patent is extended or adjusted under 35 U.S.C. 154(b) by 991 days.

(21) Appl. No.: 17/055,238

(22) PCT Filed: May 14, 2019

(86) PCT No.: PCT/US2019/032162
§ 371 (c)(1),
(2) Date: Nov. 13, 2020

(87) PCT Pub. No.: WO2019/222172
PCT Pub. Date: Nov. 21, 2019

(65) Prior Publication Data
US 2021/0268943 A1    Sep. 2, 2021

Related U.S. Application Data

(60) Provisional application No. 62/671,627, filed on May 15, 2018.

(51) Int. Cl.
*B60N 2/50*    (2006.01)
(52) U.S. Cl.
CPC .............. *B60N 2/501* (2013.01); *B60N 2/502* (2013.01)

(58) Field of Classification Search
CPC ................................ B60N 2/501; B60N 2/502
(Continued)

(56) References Cited

U.S. PATENT DOCUMENTS 3,701,499 A * 10/1972 Schubert ............ B64D 11/0689
188/1.11 R
5,346,170 A * 9/1994 Schmidt ................. B60N 2/508
248/588

(Continued)

FOREIGN PATENT DOCUMENTS

EP    2 431 218 A1    3/2012

OTHER PUBLICATIONS

PCT/US2019/032162, Aug. 5, 2019, International Search Report and Written Opinion.
(Continued)

*Primary Examiner* — Muhammad Ijaz
(74) *Attorney, Agent, or Firm* — Wolf, Greenfield & Sacks, P.C.

(57) ABSTRACT

Embodiments related to the operation of an active seat suspension using prefiltered road data are described. In one embodiment, the prefiltered road data may be filtered to exclude road and/or driving inputs with low frequencies, or long length scales, such as hills or curves. Such an embodiment may at least partially reduce operation of an active seat suspension in response to these low frequency long length scale of inputs where displacements of the vehicle may be greater than a range of motion of the active seat suspension while still permitting the active seat suspension to respond to higher frequency inputs.

20 Claims, 9 Drawing Sheets

(58) Field of Classification Search
USPC .......................................................... 248/550
See application file for complete search history.

(56) References Cited

U.S. PATENT DOCUMENTS

| | | | | |
|---|---|---|---|---|
| 6,467,748 B1* | 10/2002 | Schick | ................. | B60G 17/056 |
| | | | | 267/136 |
| 2014/0095022 A1* | 4/2014 | Cashman | ............... | B60N 2/501 |
| | | | | 701/37 |
| 2014/0263911 A1* | 9/2014 | Parker | .................... | B60N 2/501 |
| | | | | 248/327 |
| 2015/0001771 A1* | 1/2015 | Lorey | .................... | B60N 2/525 |
| | | | | 267/126 |
| 2015/0224845 A1* | 8/2015 | Anderson | ............... | F03G 7/081 |
| | | | | 701/37 |
| 2017/0136842 A1* | 5/2017 | Anderson | ............. | B60G 17/016 |
| 2017/0240017 A1 | 8/2017 | Vandersmissen et al. | | |
| 2017/0253155 A1* | 9/2017 | Knox | ........................ | B60K 5/12 |
| 2017/0305311 A1 | 10/2017 | Haller et al. | | |
| 2018/0015842 A1* | 1/2018 | Hardee | ................ | B60N 2/0273 |
| 2020/0139784 A1* | 5/2020 | Sridhar | .................. | B60G 21/08 |

OTHER PUBLICATIONS

International Search Report and Written Opinion for International Application No. PCT/US2019/032162 mailed Aug. 5, 2019.

\* cited by examiner

ACTIVE SEAT SUSPENSION WITH HIGH FREQUENCY INPUT CANCELLATION

CROSS-REFERENCE TO RELATED APPLICATIONS

This application is a national stage filing under 35 U.S.C. § 371 of International Patent Application Serial No. PCT/US2019/032162, filed May 14, 2019, which claims the benefit of priority under 35 U.S.C. § 119 (e) of U.S. Provisional Application Ser. No. 62/671,627, filed May 15, 2018, the disclosures of each of which are incorporated by reference in their entirety.

FIELD

Disclosed embodiments are related to active seat suspensions including high frequency input cancellation.

BACKGROUND

Vehicles are subjected to various motion inputs as they are operated. For example, as a vehicle is driven down a road, external disturbances may input motions and accelerations into the vehicle. Accordingly conventional vehicles include suspension systems such as passive, semiactive, and/or active suspension systems to mitigate at least a portion of these accelerations and displacements that may be transmitted to a frame of the vehicle. These accelerations and displacements may then be transferred to a cabin of the vehicle in which a vehicle occupant is located and further transferred to the vehicle occupant through a vehicle seat. To help mitigate these accelerations and displacements from being transmitted to a vehicle occupant located within the vehicle cabin, some vehicles may include active seat suspensions that control motion of an associated vehicle seat in one or more translational and/or rotational directions including, for example, heave, roll, and/or pitch, to at least partially mitigate the accelerations and displacements that are transmitted to the seat and occupant.

SUMMARY

In one embodiment, a method of controlling an active seat suspension in a vehicle includes: selecting prefiltered road data located along a path of travel of the vehicle; sensing accelerations applied to the vehicle in one or more directions as the vehicle travels along a road surface; and controlling operation of the active seat suspension based at least partly on the sensed accelerations and the prefiltered road data located along the path of travel of the vehicle.

In another embodiment, an active seat suspension includes one or more sensors configured to sense accelerations applied to the vehicle in one or more directions, one or more actuators that control operation of the active seat suspension in one or more directions, and a controller of the active seat suspension system operatively coupled to the one or more sensors and the one or more actuators. The controller is configured to control the one or more actuators to operate the active seat suspension based at least partly on the sensed accelerations and prefiltered road data located along a path of travel of the vehicle.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
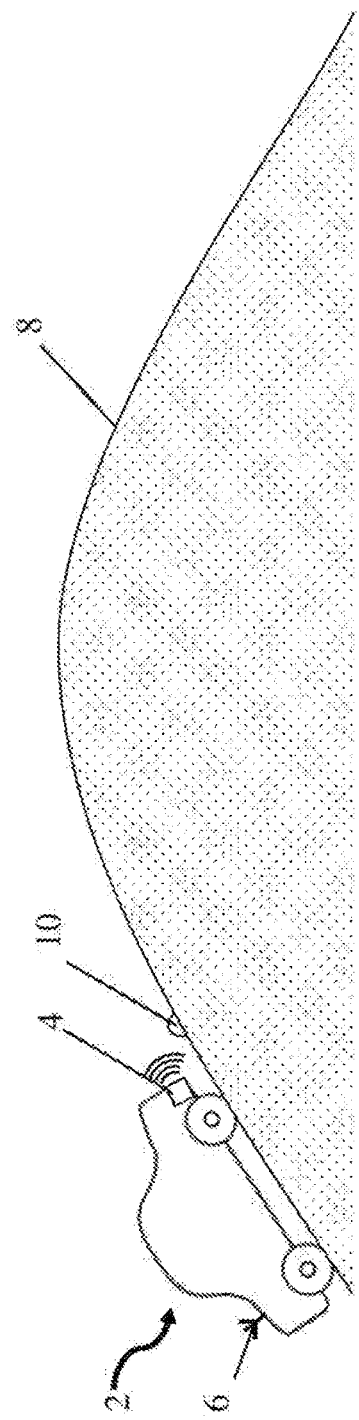
FIG. 1A is a schematic of a vehicle traversing a hill including a bump located along a road surface.

When driving a vehicle across a road surface, the vehicle may be subjected to various road and/or driving events that may result in various types and amounts of accelerations and motions being applied to the vehicle. These accelerations and motions may subsequently be transmitted to a seat within the vehicle. In some situations these events may correspond to relatively short duration road inputs to the vehicle such as bumps, pot holes, cracks, depressions, and ruts as well as short duration driving inputs such as sharp accelerations, turns, and braking events, and wheel slip. These shorter duration events may generate motions of the vehicle, and a seat contained therein, that are within a motion range of an active seat suspension contained within the vehicle, and may be at least partially mitigated by the active seat suspension. However, in other situations, the vehicle may be subject to longer duration motions over larger distance scales, which may be referred to as low frequency inputs, such as traversing a hill, curve, or traversing a banked road. In such a situation, the motion imposed on the vehicle and seat as the vehicle traverses the hill, curve, or other type of road surface may be greater than a range of motion of the active seat suspension is capable of correcting for. Accordingly, it may be desirable for an active seat suspension to react to road and/or driving events that are within their capability to at least partially mitigate while at least partially reducing, or eliminating, the response of an active seat suspension to lower frequency events over larger distance scales.

As noted above, accelerations and motions input to a vehicle from larger distance scale events such as hills and curves may have relatively lower frequencies. However, the Inventors have recognized that simply applying a low frequency filter to sensed accelerations and motions in real time to reduce a response of an active seat suspension to low frequency or large length events may have several drawbacks. Specifically, filtering the inputs in real time may create a delay (e.g., a phase delay) in a vehicle's response that may reduce an ability of the system to respond quickly to a new low frequency input. For example, an active seat suspension system applying a low frequency filter in real time may initially respond to changes in an applied acceleration signal associated with a low frequency event as might occur when a vehicle first encounters, crests, and subsequently exits from driving over a hill.

In view of the above, the Inventors have recognized the benefits associated with an active seat suspension system that is operated using prerecorded road data such that the active seat suspension may anticipate the various road and/or driving inputs that may be applied to a vehicle prior to their occurring. For example, in one embodiment, an active seat suspension may use a localized position of a vehicle and corresponding prerecorded road data associated with that localized position of the vehicle to control operation of the active seat suspension. The road data may include information related to road height variations, acceleration data, and/or any other appropriate form of information located along an expected path of travel of the vehicle. The road data may also be prefiltered to reduce, and/in some instances substantially exclude, certain types of road and/or driving events including, for example, events with frequencies greater than a threshold frequency and/or events that occur over lengths less than a threshold length. This prefiltered data may be used in combination with one or more sensed accelerations applied to the vehicle to control operation of the active seat suspension. For example, in one embodiment, prefiltered data associated with a path of travel of a vehicle may be subtracted from one or more sensed acceleration signals to provide a corrected acceleration signal which may be used to at least partly control operation of the active seat suspension.

As the term is used herein, road data may refer to information related to a driving surface a vehicle may traverse during operation. This information may correspond to various road and/or driving inputs that may be applied to a vehicle. This may take the form of surface height variations of the road surface, sensed acceleration data associated with travel across the road surface, and/or any other appropriate information that may be used to characterize road and/or driving inputs that may result in accelerations and/or motions of a vehicle as it is driven across the road surface. In embodiments where prerecorded acceleration signals are used, the acceleration data may correspond to accelerations in any appropriate direction including, for example, accelerations applied to a vehicle in a vertical direction, lateral direction, and/or any other appropriate direction as the disclosure is not so limited.

The above noted road data may be provided in any appropriate form. For example, in one embodiment, the road data may be included in a map of the road surface which may be stored at least partially on a local memory within the vehicle and/or active seat suspension. The map including the desired road data may be pre-recorded in any appropriate fashion. For example, information related to various road surfaces may be prerecorded in a systematic fashion using any appropriate method and may subsequently be compiled into a map that may then be provided to individual vehicles for use. Alternatively, individual vehicles traveling over a particular road surface may record the accelerations, or other appropriate information, applied to a vehicle as it traverses the road surface using accelerations sensors, vehicle suspension inputs, and/or other appropriate types of sensors. This information may be stored locally in memory of the vehicle or active seat suspension controller to create a local map of the road surface and/or the information may be transmitted to a remote server. Uploading the information to a remote server may help to create and provide an updated map including the desired road data that may then be transmitted to one or more other vehicles as well. The road data may be collected by using one or more vehicles in real time and shared among multiple vehicles as it is being collected, and/or may be uploaded for later use. Vehicles collecting that road data may be equipped with various sensors, such as for example, RADAR, LiDAR, GPS, ultrasonic detectors, video cameras, accelerometers, inertial measurement units (IMUs). One or more sensors may be attached to the sprung mass and/or the unsprung mass of the vehicle. In view of the above, it should be understood that any appropriate method for pre-recording and providing the desired road data to a vehicle may be used as the disclosure is not so limited. In either case, the prerecorded road data may be pre-filtered prior to use by a controller of an active seat suspension as detailed further below.

Depending on the particular embodiment, road data related to an expected path of travel of a vehicle may be provided to a controller of the vehicle and/or an active seat suspension in any appropriate manner. For example, in one embodiment, local memory associated with either the vehicle and/or the active seat suspension may store road data for a desired area of operation of the vehicle. Alternatively, in instances where an expected area of operation of the vehicle may be larger than local memory may easily accommodate, it may be desirable to transmit road data to a controller of the vehicle and/or the active seat suspension for areas proximate to a vehicle's location. For instance, a local buffered map may be continuously updated using information transmitted to the vehicle from a remotely located database to provide road data to a vehicle for both an area where a vehicle is currently located and areas it is traveling towards. In instances where road data is communicated to a vehicle, any appropriate type of wireless communication protocol may be used to communicate information from the remotely located database to a controller of a vehicle and/or active seat suspension as the disclosure is not limited in this fashion.

Road data to be used in the control of an active seat suspension may be prefiltered in any appropriate way to at least partially remove signals associated with certain types of road and/or driving inputs. For example, in some embodiments, the road data may be recorded, and provided to a controller of a vehicle and or active seat suspension, in a distance domain. Accordingly, to exclude high frequency events, the road data may be prefiltered using a low-pass filter to at least partially exclude inputs with frequencies in the distance domain that are greater than a threshold frequency. In the distance domain, the low-pass filter may filter signals greater than or equal to a threshold frequency of approximately 0.01 cycles/meter, 0.1 cycles/meter, or 0.3 cycles/meter. Of course prefiltered road data in which the road data has been prefiltered for inputs that occur with frequencies in the distance domain that are both greater than and less than those noted above are also contemplated as the disclosure is not so limited.

In the above embodiment, the road data has been described as being prefiltered while in the distance domain. However, as elaborated on further below, the timescales and frequencies of operation of a vehicle as it traverses a road surface may be dependent on a velocity of the vehicle. In alternate embodiments, the road data may be collected, filtered, and/or stored in the time domain, and normalized based on a reference vehicle velocity. For example, for a reference vehicle velocity of 20 m/s, a frequency in the distance domain of 0.1 cycles/meter may corresponds to a frequency in the time domain of 2 Hz. Any appropriate reference vehicle speed may be selected for such considerations as the disclosure is not so limited. Accordingly, depending on the particular embodiment, the prefiltered road data may be collected and stored in the time domain, or may be collected and stored in the distance domain and subsequently transformed to provide the desired information in a time domain. This transition may either occur prior to and/or after the road data has been prefiltered. For example, in instances where the road data is transformed to a time domain prior to being filtered, the road data may be filtered using a low-pass filter to at least partially exclude inputs with frequencies greater than or equal to a threshold frequency cutoff. In certain embodiments, the threshold frequency cutoff may be 0.5 Hz, 2 Hz, or 5 Hz though threshold frequencies both greater than and less than these frequencies may also be used. In contrast, when the road data is prefiltered in the distance domain, the prefiltered data may be transformed to the time domain as elaborated on below.

A localized position of a vehicle may be determined using any appropriate position localization method. For example, in one embodiment, a position of a vehicle may be determined using a global positioning system (GPS). In another embodiment, a wireless position localization protocol may be used in which signal such as cellular signals may be used to triangulate a position of a vehicle. In yet another embodiment, vision based localization methods may be used to determine a location of a vehicle using sensors such as radar, LIDAR, and/or optical detectors in combination with a map of a road surface including identifiable landmarks and features for use in such a method. In yet another embodiment, the vehicle may be localized by identifying characteristics of a road surface using one or more accelerometers attached to the vehicle or components thereof, and comparing the identified characteristics with a map of a road surface. Of course combinations of the above noted methods, as well as other appropriate forms of position localization may be used as the disclosure is not so limited. For example, a GPS and/or wireless triangulation method may be used to provide a rough location of a vehicle and a vision based system may be used to identify surrounding landmarks to provide a more accurate localized position of the vehicle.

In addition to determining a localized position of a vehicle, in some embodiments, it may be desirable to determine an expected path of travel of the vehicle relative to the determined localized position. A path of travel of the vehicle may be determined using any appropriate method. For example, in one embodiment, a path of travel of the vehicle may be determined using the current vehicle position, a direction of travel of the vehicle, a speed of the vehicle, a steering angle of the vehicle, and/or any appropriate combination of the foregoing. In another embodiment, look ahead sensors such as radar, LIDAR, and/or an optical detector may be used to identify a direction of travel of the vehicle which may be taken as the current path of travel of the vehicle. In yet another embodiment, the vehicle may be an autonomous vehicle. In such an embodiment, a controller of the autonomous vehicle may plan a path of travel from the current vehicle position to an intended destination. The controller of the autonomous vehicle may then operate the vehicle such that the vehicle follows a preplanned path of travel from the current vehicle position to the intended destination. In either case, once a current path of travel and/or a preplanned path of travel has been determined, road data corresponding to the path of travel of the vehicle may be selected for use with an active seat suspension. For example, in an embodiment where the road data is provided as a map, the localized position and determined path of travel relative to the map may be used to select the road data in the map located along the path of travel of the vehicle.

For the sake of clarity, the embodiments described herein are primarily directed to the control of an active seat suspension using prefiltered road data to control the heave and/or roll of a vehicle seat. For example, in one embodiment, it may be undesirable to control the heave and/or roll of an active seat suspension in response to long duration, i.e. low frequency, accelerations associated with a hill or curve. Instead, the active seat suspension may primarily control the heave and/or roll of a seat in response to shorter duration, i.e. higher frequency, events experienced by a vehicle such as bumps, pot holes, cracks, depressions, and/or ruts as well as sharp accelerations, turns, and/or braking events. However, embodiments in which the disclosed active seat suspensions are used to control rotation and/or translation of a vehicle seat in a different direction are also contemplated. For example, the disclosed active seat suspension systems may also be used to control a pitch of a vehicle seat.

As used herein, the term "heave" may refer to motion of a seat in a generally vertical direction relative to the vehicle's frame of reference, which in some embodiments herein may be referred to as movement along a vertical-axis of a seat and/or vehicle. For example, when a vehicle is stationary and located on level ground, a vertically oriented axis may extend upwards in a direction that is perpendicular to the level ground. Further, in some embodiments, this vertically oriented axis may also be approximately perpendicular to a direction in which an underlying surface of the vehicle interior generally extends even though a floor of a vehicle interior typically is not flat. In either case, it should be understood that even when a vehicle is no longer located on level ground, terms such as heave, vertical movement, movement along a vertical-axis, and/or other similar terms may refer to movement of the seat in a direction that is parallel to this vertical axis which may remain approximately vertical relative to the vehicle's frame of reference. Thus, a vertical axis of a vehicle and/or seat, as well as the associated types of movement noted above, may be understood to be a vertical axis fixed relative to a reference frame of the vehicle, not a global reference frame.

As used herein, the term "roll" may refer to the rotational motion of a seat about an axis that is parallel to a generally longitudinal axis of the vehicle passing from a front to a rear of the vehicle. In some embodiments, this may be referred to as roll of a seat or rotation of the seat about a longitudinal-axis of the seat, seat base or vehicle. For example, when a vehicle is, not loaded, stationary and located on level ground, a longitudinal axis of the vehicle may pass from a front of the vehicle to a rear of the vehicle in a direction that is generally parallel to the ground. The seat may then rotate, or roll, about an axis that extends in a direction that is parallel to this longitudinal axis of the vehicle. Further, even when the vehicle is not located on level ground, this longitudinal axis still passes from a front of the vehicle to a rear of the vehicle relative to the vehicle's frame of reference regardless of the vehicle's global orientation. Similarly, a lateral direction may refer to a direction or axis that is perpendicular to the longitudinal axis of the vehicle such that it passes between the two opposing sides of the vehicle. Again, this lateral direction may be defined relative to the vehicle's frame of reference, not a global reference frame.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1A depicts one embodiment of a vehicle 2 traveling along a road surface located on a hill 8. The vehicle may include one or more look ahead sensors 4 for sensing information about the environment surrounding the vehicle including, for example, height variations of the road surface. In some embodiments, the vehicle may also include a wireless communication system 6 for wirelessly communicating with a remotely located database for downloading road data to the vehicle for subsequent use. As the vehicle traverses the hill, a vertical acceleration and corresponding displacement of the vehicle, and a seat located therein, occurs. As previously noted, the height change associated with traversing the hill is outside of an operational range of an active seat suspension located within the vehicle. Accordingly, in some embodiments, it may be desirable to operate the active seat suspension in a way such that it does not substantially respond to the long length scale, i.e. low frequency, height changes that occur as the vehicle traverses the hill. This is in contrast to the accelerations and displacements associated with an obstacle, such as a bump 10, or other short duration, i.e. higher frequency, road and/or driving inputs that may also be encountered by the vehicle as it traverses the hill. For example, when the vehicle encounters the bump, some amount of acceleration and motion imparted to the vehicle may be transmitted to a seat contained therein. Accordingly, it may be desirable for an active seat suspension to at least partially mitigate these higher frequency accelerations and motions imparted to the vehicle while not responding to the lower frequency accelerations and motions associated with traversing the hill itself.

Figure 1B:
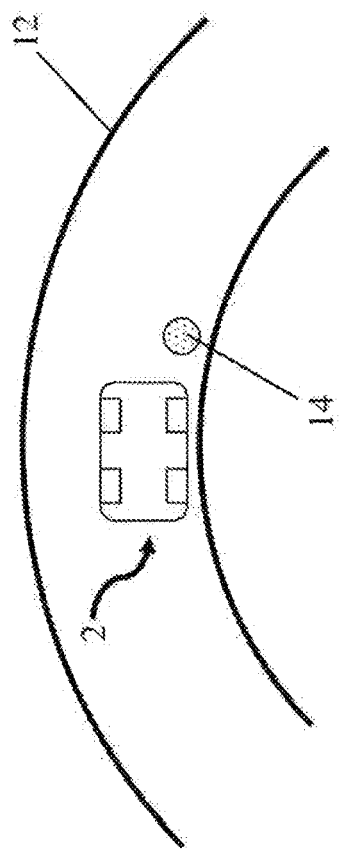
FIG. 1B is a schematic of a vehicle traversing a curve including a pothole located along a road surface.

FIG. 1B illustrates another instance in which may be desirable to exclude at least a portion of low frequency accelerations applied to a vehicle when controlling an active seat suspension. In the figure, a vehicle 2, similar to that described above for FIG. 1, may be traveling around a curve or corner 12. As the vehicle travels around the depicted curve, a lateral acceleration may be applied to the vehicle, and a seat located therein over, for a duration and corresponding length scale. Thus, this lateral acceleration from traversing the curve may be applied with a relatively low frequency and the overall displacement of vehicle may be outside of the active seat suspension's operational range to mitigate. This is in contrast to the lateral accelerations applied to a vehicle traversing a relatively straight portion of a road. Accordingly, in some embodiments, it may be desirable to either not roll, or at least reduce an amount of roll, applied by an active seat suspension in response to travel around the large length scale curve. In contrast, when the vehicle encounters a pothole 14, this may induce a short duration, i.e. high-frequency, lateral acceleration that may be transmitted to the vehicle and seats within the vehicle. Therefore, while in some embodiments, the response to the long duration curve, and the associated low-frequency lateral accelerations, may be reduced and/or eliminated, in some embodiments, it may still be desirable to control a roll of the seats within the vehicle in response to any lateral accelerations applied to the vehicle by shorter duration, i.e. higher frequency, inputs such as the depicted pothole.

While several possible examples of low-frequency road inputs to a vehicle have been described above, i.e. hills and curves, it should be understood that the current disclosure is not limited to only these two examples. Instead, the current disclosure is intended to apply to controlling the operation of active seat suspensions relative to any appropriate type of road input that is applied over long durations/length scales, with correspondingly low frequency accelerations, as the disclosure is not limited in this fashion.

Figure 2:
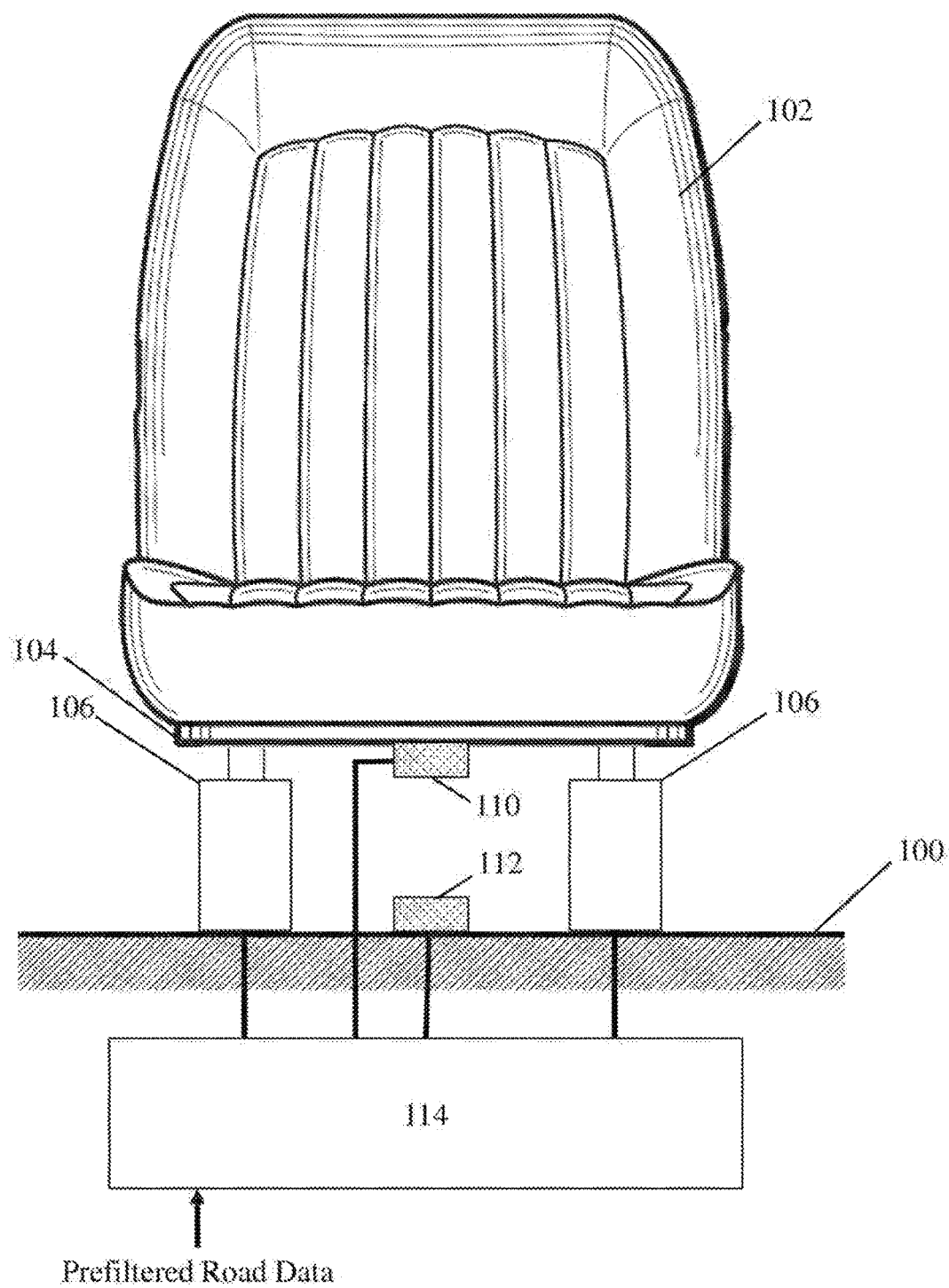
FIG. 2 is a schematic of one embodiment of an active seat suspension.

FIG. 2 depicts one embodiment of an active seat suspension. In the depicted embodiment, two actuators 106 are operatively coupled to two opposing portions of a seat base 104 of a seat 102. The actuators may be operated to displace the associated portions of the seat in a vertical direction relative to the actuators and an underlying portion of the vehicle 100 such as a vehicle interior floor or frame of the vehicle. By cooperatively controlling motion of the two actuators, movement of the seat may be controlled in both heave and roll directions to at least partially mitigate motions and accelerations in these directions from being transmitted to an occupant located in the seat. For example, by extending and/or retracting both actuators by the same amount, the seat may be displaced vertically. Correspondingly, operating the actuators in opposing directions may cause the seat to roll in a desired direction. Combinations of actuator operation where different amounts of displacement are applied to the seat in various directions may result in movement in both the heave and roll directions. Examples of specific active seat suspension designs as well as more detailed methods of operating such an active seat suspension are provided in U.S. patent application Ser. No. 15/953,191 filed on Apr. 13, 2018 and entitled Active Seat Suspension Systems Including Systems with Non-Back-Drivable Actuators, the disclosure of which is incorporated herein by reference in its entirety.

The depicted active seat suspension may also include a controller 112 which may be operatively coupled to the one or more actuators 106 of the active seat suspension. One or more seat sensors 108 may be operatively coupled to the controller as well. Depending on the embodiment, the one or more seat sensors may be disposed on, or within, the seat 102, the seat base 104, and/or a portion of the active seat suspension system itself. One or more vehicle sensors 110 may also be operatively coupled to the controller as well. The vehicle sensors may be disposed on an associated portion of the vehicle 100 which may be a portion of the vehicle underlying the active seat suspension and/or it may be removed from the active seat suspension as the disclosure is not so limited. The seat and vehicle sensors may be configured to sense translational and/or rotational velocities and/or accelerations applied to the vehicle and/or seat in one, two, three, and/or any appropriate number of directions during operation. For example, in one embodiment, the seat and vehicle sensors may be configured to sense one or more of vertical acceleration, lateral acceleration, and/or any other appropriate acceleration applied to the seat and/or vehicle in any desired direction. These measured acceleration signals may be output from the corresponding sensor to the controller. As depicted in the figure, the controller may also receive prefiltered road data for use in controlling operation of the active seat suspension. Again this prefiltered road data may be provided to a controller of an active seat suspension in any appropriate way including, for example, downloading the road data from a remotely located database, storing the road data in local memory of the vehicle and/or active seat suspension, a combination of the foregoing, and/or any other appropriate method of providing the desired road data to a controller of an active seat suspension.

It should be understood that any appropriate type of sensor may be used for measuring the various types of accelerations, velocities, and displacements described in relation to the embodiments disclosed herein. For example, appropriate sensors may include, but are not limited to, single axis accelerometers, three axis accelerometers, inertial monitoring units (IMU's), gyroscopes, and/or any other appropriate type of sensor.

While a particular construction for an active seat suspension in which combined movement of two linear actuators is used to control movement of a seat in the heave and roll directions has been depicted in FIG. 2, it should be understood that any appropriate type of active seat suspension capable of controlling movement of an associated seat in one or more directions may be used. For example, the actuators used in an active seat suspension may correspond to any appropriate type of actuator including both rotational and/or linear actuators. Additionally, embodiments in which an active seat suspension may include separate actuators to control movement of a seat in two or more different directions are also contemplated. In one such embodiment, a first actuator may be used to control heave of a seat while a second actuator may be used to separately control roll of the seat. Additionally, embodiments in which an active seat suspension may include one, two, three, or any appropriate number of actuators to control movement of an associated seat in one, two, three or more directions are also contemplated.

Depending on the particular construction, the actuators of an active seat suspension may also control movement of the seat via cooperative movement of the actuators or the actuators may be arranged such that they may independently control movement of the seat in the three separate directions.

Figure 3:
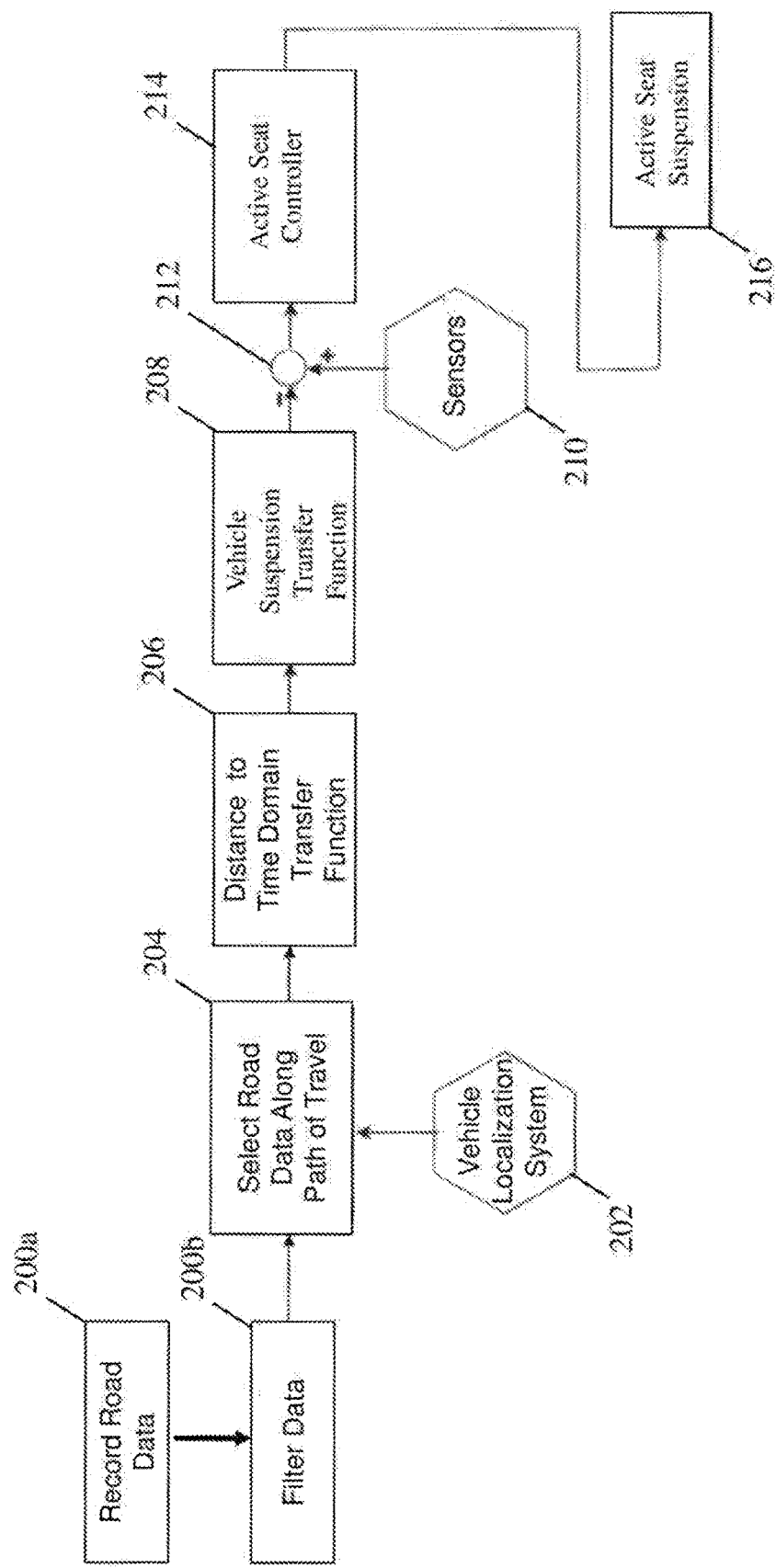
FIG. 3 is a control block diagram of one embodiment of a method of operating an active seat suspension.

FIG. 3 depicts one embodiment of a method for controlling an active seat suspension. In the depicted embodiment, road data for an area of interest may be recorded at 200a in any appropriate manner. This pre-recorded data may then be prefiltered at 200b to exclude inputs that are either above a threshold length scale and/or below a threshold frequency depending on the domain in which the road data is filtered. This prefiltered road data may either be generated by a controller of the vehicle and/or active seat suspension. In either case, the prefiltered road data may be stored locally on memory of the vehicle and/or active seat suspension or it may be downloaded and/or buffered continuously from a remotely located database. At 202 vehicle localization system may determine a localized position of the vehicle using any appropriate position localization method. The vehicle localization system may be operatively connected to and/or integrated with a controller of the vehicle, a controller of the active seat suspension, and/or any other appropriate computing device. When determining the localized position of the vehicle, the vehicle localization system may also determine a path of travel of the vehicle. This localized position information of the vehicle may be used in combination with the prefiltered data to select road data located along the path of travel of the vehicle at 204. For example, in some embodiments, the road data may be provided using a distance domain in the form of a map. Thus, road data associated with the position and path of travel of the vehicle relative to the corresponding portions of the map may be selected for use in controlling an active seat suspension.

As noted above, the road data may be provided in a distance domain in some embodiments. In such an embodiment, a controller for an active seat suspension, or other appropriate computing device, may apply an appropriate transfer function to transfer the road data from a distance domain to a time domain for subsequent use, see 206 in FIG. 3. For example, the road data may be divided by a current velocity of the vehicle to transform the road data into the time domain. In some embodiments, the road data may correspond to accelerations and/or displacements applied to the vehicle. However, the inclusion of a vehicle suspension system (i.e. active, semiactive, and/or passive suspension systems), as well as other considerations associated with the dynamic response of the vehicle, means that not all of the accelerations and/or displacements included in the road data may be transferred to a seat of the vehicle. Accordingly, in some embodiments, it may be desirable to determine a corresponding amount of acceleration and/or displacement that would be expected to be transferred to a seat in response to the indicated road data. Thus, as shown at 208, a vehicle suspension transfer function may be applied to determine an expected acceleration to be applied to the seat. In some embodiments, the vehicle suspension transfer function may simply correspond to the same control algorithms and/or models of the suspension dynamics to determine a response of the suspension to the expected dynamic input to the vehicle. In some instances where a vehicle suspension transfer function has been applied to a set of prefiltered road data, the resulting data set may be referred to as a reference seat data. However, for the sake of clarity the remainder of the disclosure references the use of prefiltered road data which may refer to road data that has, or has not, been transformed using a vehicle suspension transfer function.

At 210, one or more sensors may be used to sense accelerations applied to a seat in one or more directions. Again, the one or more sensors may either be associated with a portion of the vehicle and/or with the seat as previously discussed. In instances where the sensors measure an acceleration of the seat, it may be desirable to apply an active seat suspension transfer function to the data as well to determine the expected accelerations of the seat during operation of the active seat suspension in response to the inputs included in the prefiltered road data. At 212, the prefiltered road data along a path of the vehicle, which has been transformed into the appropriate domain and reference frame, may be subtracted from the sensed acceleration signal. Due to the prefiltered data including the low-frequency, i.e. long-duration or length, signals the resulting corrected signal may only include signals associated with the higher frequency, i.e. short duration or length, road and/or driving inputs applied to the vehicle. As shown at 214, the active seat suspension controller may control operation of the active seat suspension at 216 based at least partly on this corrected acceleration signal. Again, due to the exclusion of the lower frequency road and/or driving inputs, such as hills, curves, and other appropriate events, the active seat suspension may respond to the higher frequency events encountered during operation while at least partially, and in some instances completely, excluding operation of the active seat suspension in response to the lower frequency events over larger length scales.

It should be understood that the above steps and systems may either be separate from one another and/or they may be integrated in a single system. For example, the one or more described steps may be completed by a single integrated active seat suspension system and/or the various steps and functions may be distributed amongst various controllers and systems contained within a vehicle which may be operatively connected to, and communicate with, a controller of an active seat suspension as the disclosure is not limited in this fashion.

For the sake of clarity, the following discussion assumes that the prerecorded data is vehicle displacement data recorded over a path of travel recorded in a distance domain. However, embodiments in which the prerecorded data is recorded in a different domain and/or is a different form of road data are also contemplated. For example, the recorded data could be recorded in the time domain and/or accelerations might be recorded instead of displacements.

Figure 4:
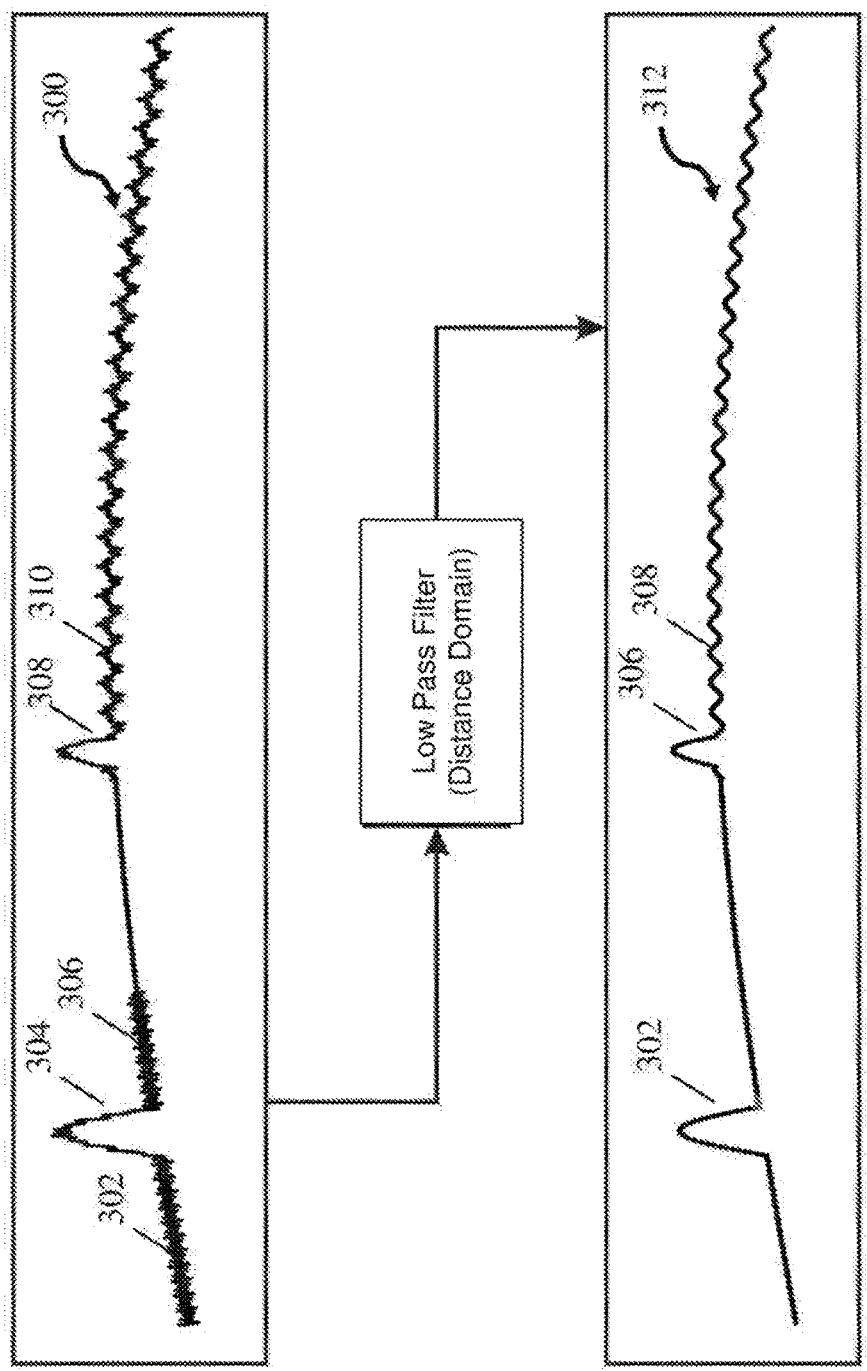
FIG. 4 is a control block diagram illustrating filtering of prerecorded road data in a distance domain.

FIG. 4 presents an example of prerecorded road data that is filtered using a high-pass filter in the distance domain to exclude various inputs over distances larger than a predetermined length threshold. As shown in the figure, the signal 300 includes an overall up-and-down displacement that may correspond to traversing a hill. Additionally there are several other inputs located along the signal that may correspond to other types of road input such as changes in the hill curvature, bumps, pot holes, cracks, depressions, ruts, and other appropriate types of features. Specifically, the signal includes a first segment 302, a second segment 304, a third segment 306, a fourth segment 308, and a fifth segment 310. The first and third segments including a number of low amplitude short duration displacements, i.e. high frequency inputs, whereas the second, fourth, and fifth segments include a combination of large amplitude displacements over larger distance as well as multiple short duration displacements over the same distance. However, once the high-pass filter is applied to the prerecorded data, the short length scale, i.e. high frequency inputs, of the signal are removed leaving the larger length scale features such as the overall hill curvature for example. This is further illustrated by the first and third segments being absent from the filtered signal 312 and the remaining signals present in the second, fourth, and fifth segments corresponding to the longer duration displacements without the original high frequency inputs that were present in those segments in the original signal.

Figure 5:
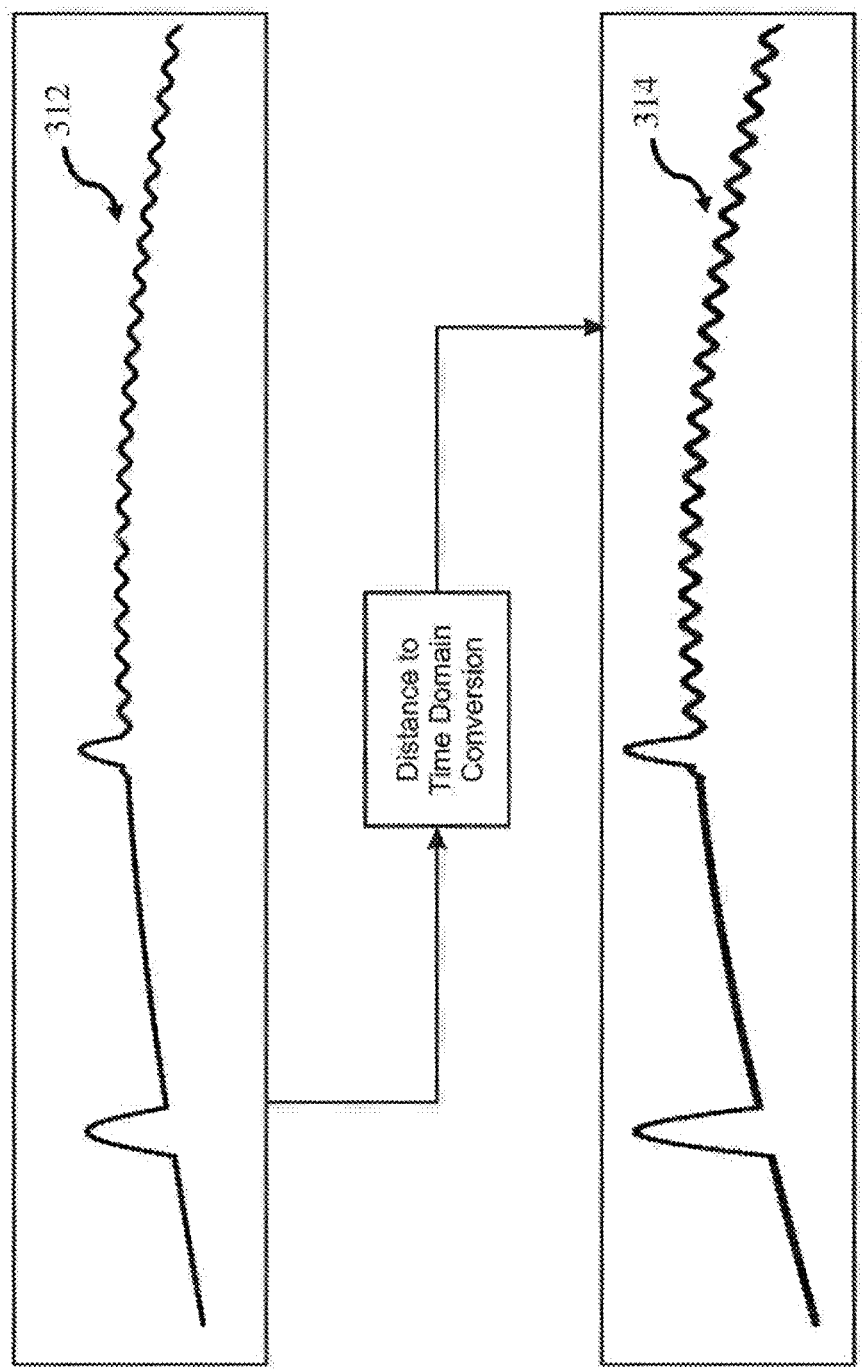
FIG. 5 is a control block diagram illustrating converting the prefiltered data from a distance domain to a time domain.

As noted previously in instances where the prerecorded and prefiltered data is provided in a distance domain, it may be desirable to convert the prefiltered signal into a domain that is more easily usable for controlling operation of an active seat suspension. For example, as shown in FIG. 5, the prefiltered signal 312 may be converted from a distance domain to a time domain shown as signal 314. While this may be done in any appropriate fashion, in one embodiment, this may be done by dividing the prefiltered signal in the distance domain by the vehicle's velocity.

Figure 6:
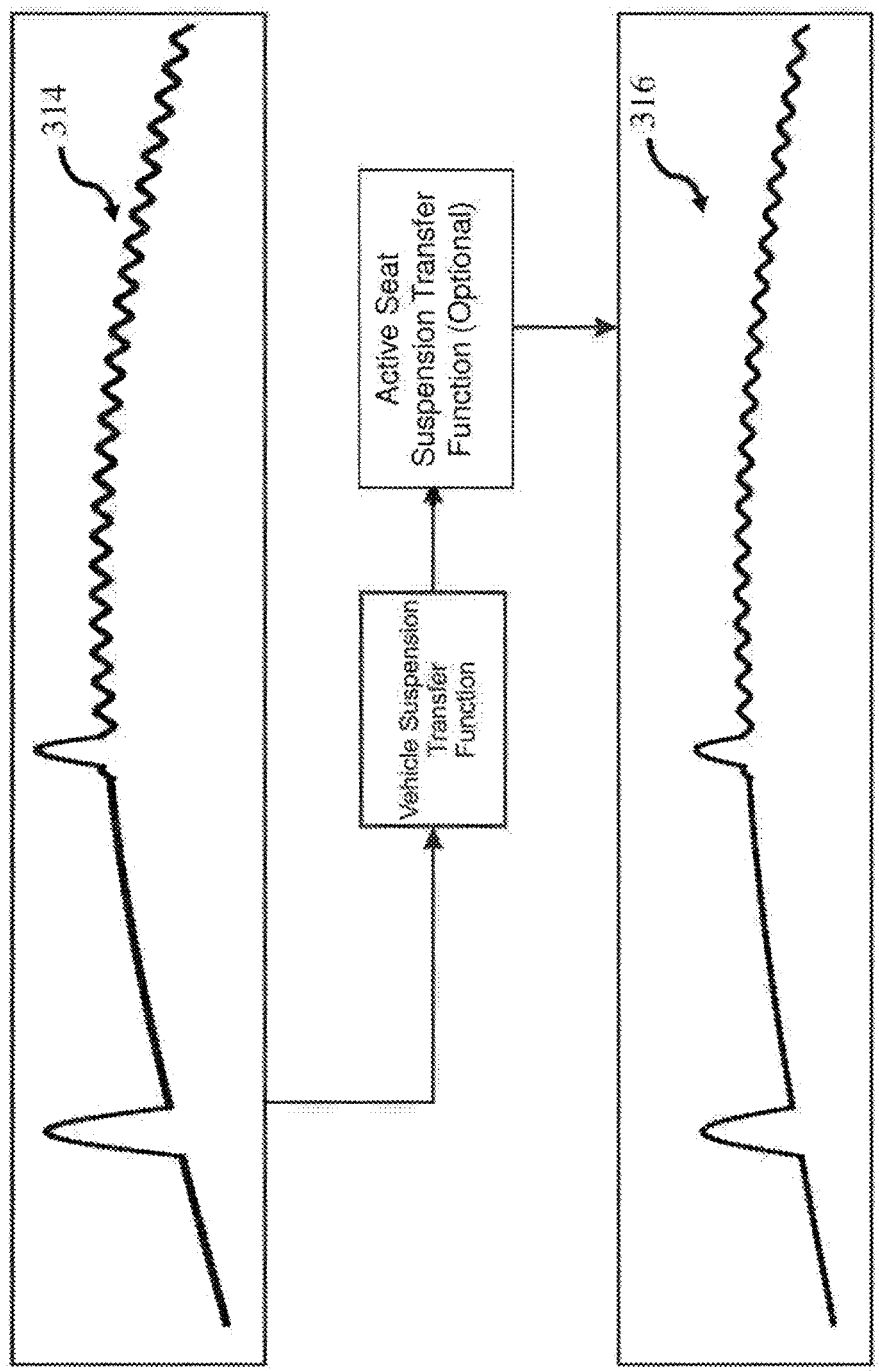
FIG. 6 is a control block diagram illustrating the application of a vehicle suspension transfer function to prefiltered road data.

Depending on the particular location of a sensed acceleration signal used for controlling operation of an active seat suspension, one or more transfer functions may be applied to the prefiltered data to appropriately correlate the prefiltered data with the sensed acceleration signal, see FIG. 6. For example, if the sensor is configured and positioned to sense an acceleration of the vehicle frame for controlling operation of the active seat suspension, it may be desirable to apply a vehicle suspension transfer function to signal 314 to determine the accelerations and/or motions transferred from a road surface to a vehicle interior where a seat may be located. In contrast, if the sensor is associated with a seat, and thus is sensing an acceleration of the seat, it may be desirable to apply both a vehicle suspension transfer function as well as an active seat suspension transfer function to signal 314 to correlate the prefiltered data with acceleration signals of the seat. This process may result in a prefiltered acceleration signal 316 that is correlated with the same reference as the sensed acceleration signals from the one or more sensors. For instances, as shown in the figure, the overall magnitudes of the inputs in the signal 316 are a lower magnitude as compared to the signals contained in the prior signal 314 illustrating the expected motion mitigation associated with the vehicle and/or active seat suspensions.

Figure 7:
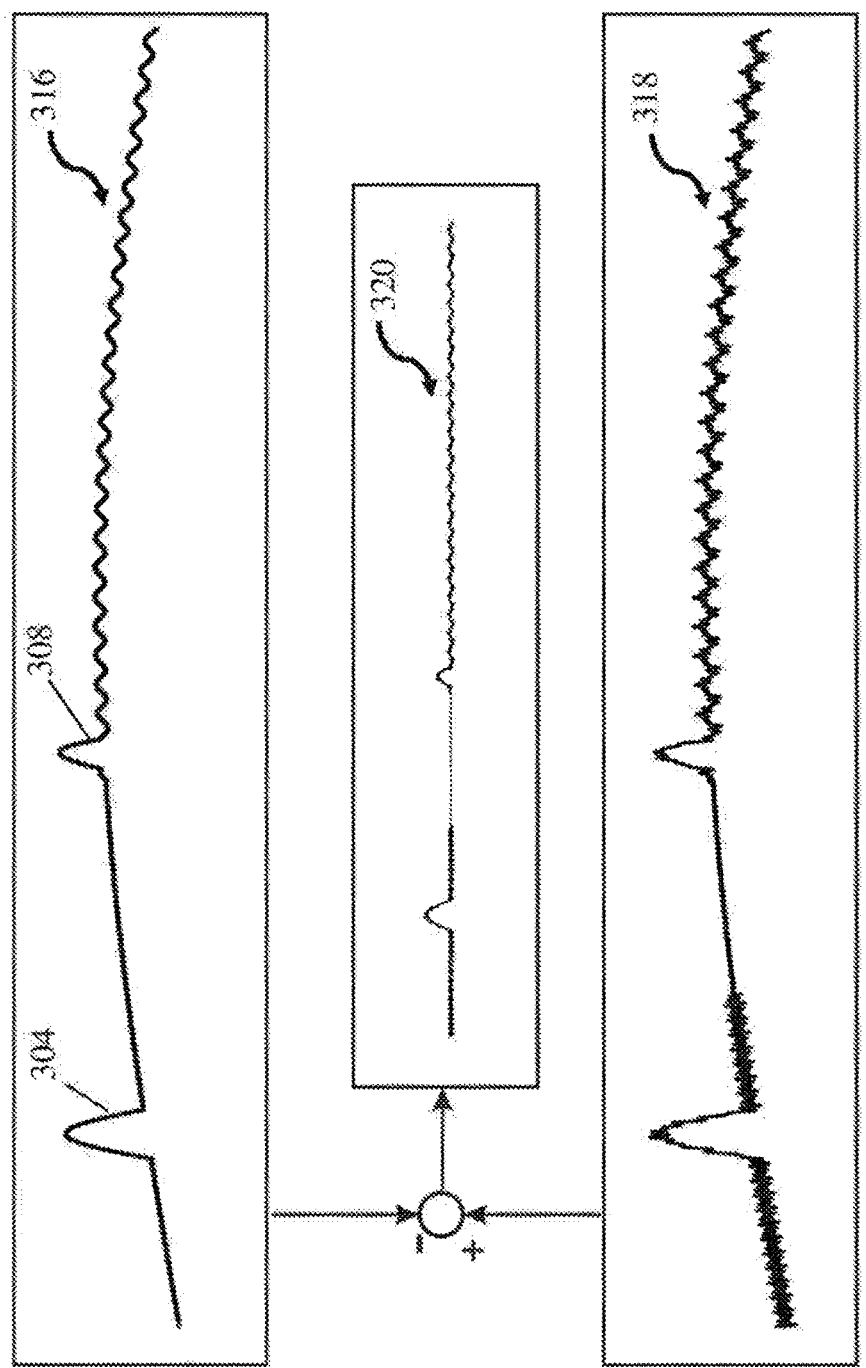
FIG. 7 is a control block diagram illustrating subtracting prefiltered road data from road data that is sensed in real-time.
Figure 8:
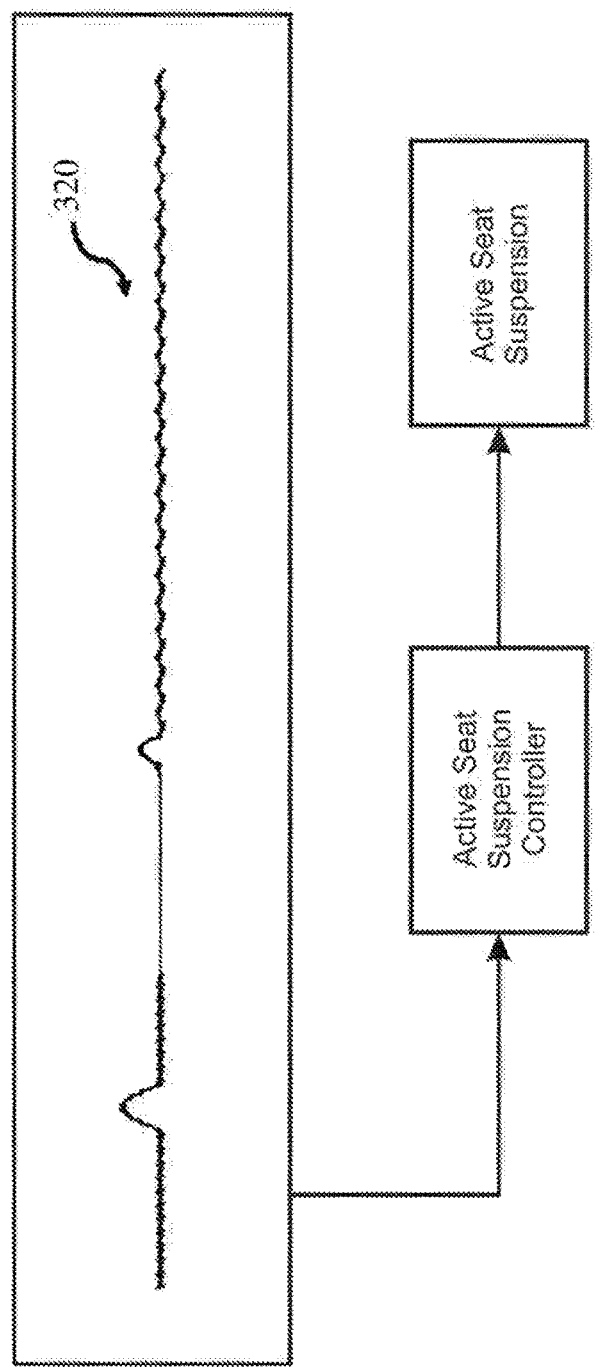
FIG. 8 is a control block diagram showing the use of corrected road data being input to a controller of an active seat suspension.

FIG. 7 illustrates the use of a prefiltered acceleration signal 316 and a sensed acceleration signal 318. The prefiltered acceleration signal is subtracted from the sensed acceleration signal to provide a corrected acceleration signal 320 with the low frequency accelerations removed. However, as seen in the figure, certain frequency ranges in between relatively low and high frequencies may be partially included in this corrected signal. For example, the larger magnitude variations included in segments 304 and 308 are still at least partially present in the corrected signal sense these segments were partially reduced during the prefiltering process. Therefore, it should be understood that depending on the particular method in which the data is filtered and the frequency/length scales of the road inputs, certain inputs may be completely, partially, or substantially unfiltered during this process. Regardless, the resulting corrected acceleration signal may be input into a controller of an active seat suspension which may then command the active seat suspension to operate to mitigate the desired high-frequency accelerations as shown in FIG. 8.

In another embodiment, a road classification may be performed based on the prefiltered acceleration signal 316. Based on determined road classification, the controller of the active seat suspension system may change a mode of operation. For example, the controller may change from a high isolation mode (i.e., filtering out as much road content as possible) to a lower isolation mode (i.e., allowing the seat (and therefore the occupant of the seat) to experience some additional road feel). Such a change in mode of operation based on the prefiltered acceleration signal 316 may allow for a more comfortable and/or more natural ride experience. The mode of operation selected based on the prefiltered acceleration signal 316 may be different depending on the type of vehicle, e.g., an autonomous vehicle, an occupant-driven vehicle, a truck, a passenger car, a sports car, etc. In some instances, a user may be able to select a ride and/or comfort preference that may be used as an input to the controller's selection of the mode of operation.

Figure 9:
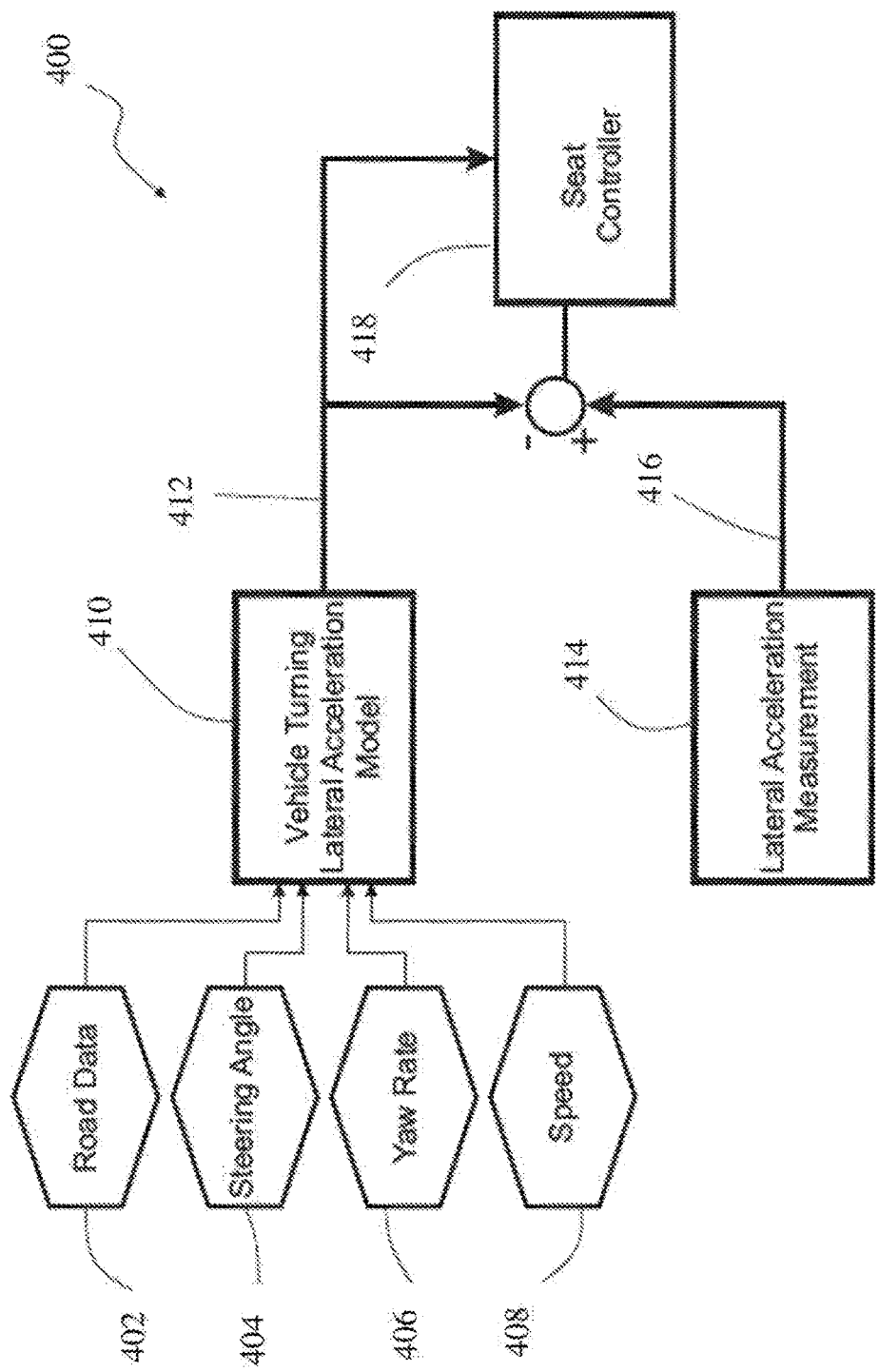
FIG. 9 is a control block diagram of one embodiment of a method for controlling a roll of an active seat suspension using prefiltered road data and various sensed operating states of a vehicle.

FIG. 9 depicts a control block diagram of one embodiment of a method 400 for controlling the roll of a seat using an active seat suspension using prefiltered road data. In the depicted embodiment, prefiltered road data 402, a steering angle 404, a yaw rate 406, and a vehicle speed 408 may be input into a model of the vehicle to determine an expected lateral acceleration of the vehicle. Similar to the embodiment described relative to FIGS. 4-8, the prefiltered road data may include road inputs that either are in, or will be transformed into, the time domain and have been filtered to at least partially remove signals with frequencies greater than a predetermined frequency threshold and/or events with length scales less than a threshold length. Further, since the current embodiment is directed to controlling roll of a seat, the prefiltered data may include information related to lateral accelerations applied to a vehicle. The steering angle and vehicle speed may be provided to a controller of an active seat suspension, or another appropriate computing device, from a connected vehicle controller over a local communication network such as a vehicle CAN. Separately, the yaw rate of the vehicle may be measured using an appropriately constructed and arranged rotational acceleration sensor such as an IMU and/or gyroscope. Once these separate types of information are input to the vehicle turning model, an expected lateral acceleration of the vehicle may be determined. In one embodiment, the prefiltered lateral acceleration data may have been measured for a given steering angle, yaw rate, and vehicle speed. Accordingly, the model may account for differences between the current driving conditions and those parameters. For example, faster speeds, more aggressive (i.e. larger) steering angles, and larger yaw rates may be associated with correspondingly larger expected lateral accelerations. The model may then output a resulting prefiltered lateral acceleration signal at 412. In certain embodiments, the prefiltered lateral acceleration data may have been low-pass filtered, and this prefiltered lateral acceleration data may be subtracted from a measured lateral acceleration to yield a differential acceleration. The differential acceleration may be input into the controller, and the active suspension system may respond to control movement of the vehicle seat relative to the vehicle in order to effectively reduce or 'cancel out' the effect of this differential acceleration.

While any appropriate type of model may be used to determine an expected lateral acceleration of a vehicle, in one embodiment, expected lateral acceleration may be determined by subtracting a product of yaw rate and speed from a measured lateral acceleration. This expected lateral acceleration may be transformed between the distance domain and time domain based on a speed of the vehicle.

The prefiltered lateral acceleration signal may be directly output to an active seat suspension controller 418. Additionally, an actual lateral acceleration applied to the vehicle may be sensed at 414 using one or more appropriate sensors. Similar to the above embodiments, the prefiltered lateral acceleration signal 412 may be subtracted from the sensed acceleration signal 416 prior to a corrected lateral acceleration signal being output to the active seat suspension controller. Depending on the particular embodiment, the active seat suspension controller may control operation of the active seat suspension purely using the corrected acceleration signal to provide a desired amount of seat roll to at least partially mitigate lateral motion and roll of a seat occupant due to high frequency events such as bumps and pot holes. However, in some embodiments, it may be desirable to include at least some roll during a low frequency event to help improve occupant comfort. In one such embodiment, it may be desirable to roll a seat into a turn, i.e. towards a center of the turn, by some amount related to how aggressive the turn is to increase the vehicle occupant's comfort. Accordingly, in some embodiments, the active seat controller may apply a first commanded roll angle based on the low frequency events included in the prefiltered lateral acceleration signal and a second commanded roll angle based on the corrected lateral acceleration signal to at least partially mitigate any higher frequency events that may occur during vehicle operation. The total roll command output by the controller to the active seat suspension may be a combination of these two commanded roll angles.

While a particular method for controlling roll angles of a seat using an active seat suspension has been detailed above, it should be understood that the current disclosure is not limited to only this particular embodiment, and that other ways of controlling roll of a seat using prefiltered road data are also contemplated.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single controller, multiple controllers, and/or other appropriate computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a controller or computing device may be embodied in any of a number of forms, such as an integrated processing unit, a printed circuit board, a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone or any other suitable portable or fixed electronic device.

Also, a computing device may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Such computing device may be interconnected by one or more networks in any suitable form, including as a local area network, such as a vehicle Controller Area Network (CAN bus), or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An active seat suspension comprising:
   one or more sensors configured to sense accelerations applied to a vehicle in one or more directions;
   one or more actuators that control operation of the active seat suspension in one or more directions; and
   a controller of the active seat suspension operatively coupled to the one or more sensors and the one or more actuators, wherein the controller is configured to control the one or more actuators to operate the active seat suspension based at least partly on the sensed accelerations and prefiltered road data located along a path of travel of the vehicle;
   wherein the prefiltered road data comprises prefiltered acceleration data and/or prefiltered road height variations, wherein the prefiltered road data is lowpass filtered to at least partially exclude road inputs with frequencies in a distance domain less than 0.3 cycles/meter.

2. The active seat suspension of claim 1, wherein the controller is configured to control the one or more actuators to operate the active seat suspension based at least partly on a vehicle suspension transfer function.

3. The active seat suspension of claim 2, wherein the controller is configured to generate reference seat data by applying the vehicle suspension transfer function to the prefiltered road data, determine a corrected acceleration signal by subtracting the reference seat data from the sensed accelerations, and control operation of the active seat suspension based at least partly on the corrected acceleration signal.

4. The active seat suspension of claim 1, further comprising a vehicle localization system operatively coupled to the controller, wherein the vehicle localization system determines a localized position and the path of travel of the vehicle.

5. The active seat suspension of claim 4, further comprising memory including a map with the prefiltered road data, and wherein the controller is configured to select the prefiltered road data using the localized position and the path of travel of the vehicle relative to the map.

6. The active seat suspension of claim 1, wherein the controller is configured to transform the prefiltered road data between a distance domain and a time domain.

7. The active seat suspension of claim 1, wherein the controller is configured to determine a corrected acceleration signal by subtracting the prefiltered road data from the sensed accelerations.

8. The active seat suspension of claim 7, wherein the controller is configured to control operation of the active seat suspension based at least partly on the corrected acceleration signal.

9. The active seat suspension of claim 1, wherein the one or more sensors are configured to sense an acceleration applied to the vehicle in a vertical direction relative to a reference frame of the vehicle, and wherein the controller is configured to control operation of the active seat suspension in the vertical direction.

10. The active seat suspension of claim 1, wherein the one or more sensors are configured to sense an acceleration applied to the vehicle in a lateral direction relative to a reference frame of the vehicle, and wherein the controller is configured to control operation of the active seat suspension in a roll direction.

11. An active seat suspension comprising:
one or more sensors configured to sense accelerations applied to a vehicle in one or more directions;
one or more actuators that control operation of the active seat suspension in one or more directions; and
a controller of the active seat suspension operatively coupled to the one or more sensors and the one or more actuators,
wherein the controller is configured to determine a corrected acceleration signal by subtracting prefiltered road data located along a path of travel of the vehicle from the sensed accelerations,
wherein the controller is configured to control the one or more actuators to operate the active seat suspension based at least partly on the corrected acceleration signal.

12. The active seat suspension of claim 11, further comprising memory including a map with the prefiltered road data.

13. The active seat suspension of claim 12, further comprising a vehicle localization system operatively coupled to the controller, wherein the vehicle localization system determines a localized position and the path of travel of the vehicle.

14. The active seat suspension of claim 13, wherein the controller is configured to select the prefiltered road data using the localized position and the path of travel of the vehicle relative to the map.

15. The active seat suspension of claim 11, wherein the prefiltered road data comprises prefiltered acceleration data and/or prefiltered road height variations.

16. An active seat suspension comprising:
one or more sensors configured to sense accelerations applied to a vehicle in one or more directions;
one or more actuators that control operation of the active seat suspension in one or more directions; and
a controller of the active seat suspension operatively coupled to the one or more sensors and the one or more actuators, wherein the controller is configured to control the one or more actuators to operate the active seat suspension based at least partly on the sensed accelerations and road data comprising prerecorded road inputs located along a path of travel of the vehicle;
wherein the road data is prefiltered to reduce and/or remove prerecorded road inputs with frequencies greater than a threshold frequency and/or road inputs which occur over a length greater than a threshold length, wherein the road data is lowpass filtered to at least partially exclude prerecorded road inputs with frequencies in a distance domain less than 0.3 cycles/meter.

17. The active seat suspension of claim 16, further comprising memory including a map with the road data.

18. The active seat suspension of claim 17, further comprising a vehicle localization system operatively coupled to the controller, wherein the vehicle localization system determines a localized position and the path of travel of the vehicle.

19. The active seat suspension of claim 18, wherein the controller is configured to select the road data using the localized position and the path of travel of the vehicle relative to the map.

20. The active seat suspension of claim 16, wherein the controller is configured to transform the road data between a distance domain and a time domain.

* * * * *